United States Patent
Kim et al.

(10) Patent No.: US 11,697,163 B2
(45) Date of Patent: Jul. 11, 2023

(54) MACHINING CENTER FOR PROCESSING CENTER GROOVE AND CENTER GROOVE PROCESSING METHOD OF A CRANKSHAFT USING THE SAME

(71) Applicants: Hyundai Motor Company, Seoul (KR); Kia Corporation, Seoul (KR)

(72) Inventors: Tae Jin Kim, Ulsan (KR); Kyoungrok Noh, Changwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 44 days.

(21) Appl. No.: 17/645,612

(22) Filed: Dec. 22, 2021

(65) Prior Publication Data

US 2022/0111451 A1  Apr. 14, 2022

Related U.S. Application Data

(62) Division of application No. 16/919,446, filed on Jul. 2, 2020, now Pat. No. 11,267,056.

(30) Foreign Application Priority Data

Dec. 3, 2019 (KR) .......................... 10-2019-0159403

(51) Int. Cl.
*B23C 3/06* (2006.01)
*B23Q 1/54* (2006.01)
(Continued)

(52) U.S. Cl.
CPC .............. *B23C 3/06* (2013.01); *B23Q 1/5406* (2013.01); *B23Q 16/005* (2013.01); *B23Q 17/12* (2013.01);
(Continued)

(58) Field of Classification Search
CPC ... B23C 3/06; B23C 2215/20; B23C 2220/64; B23B 49/04; B23B 2215/20; G01M 1/34;
(Continued)

(56) References Cited

U.S. PATENT DOCUMENTS 1,515,034 A    11/1924  Griswold
4,884,210 A *  11/1989  Blaimschein ........... B23B 49/04
                                                     408/2

(Continued)

OTHER PUBLICATIONS

Smith, Steven, "The Balancing Act; Balance The Design, or Design for Balance?", Jul. 2018, obtained from vibrationfree.co.uk/uwp-content/uploads/2018/07 /the BalancingAct.pdf.

*Primary Examiner* — Erica E Cadugan
(74) *Attorney, Agent, or Firm* — Slater Matsil, LLP

(57) ABSTRACT

A machining center for machining a center groove on a pulley and a flange formed at opposite ends of a crankshaft of a vehicle includes a measurement unit configured to measure a moment of the crankshaft when the crankshaft is loaded and actuated, a control unit configured to calculate an imbalance amount of the crankshaft and to derive center drill coordinates for removing the imbalance amount, a compensation unit mounted in a base frame and configured to compensate a position of the crankshaft by rotating first and second rotating elements based on the center drill coordinates inputted from the control unit when the crankshaft is transported and clamped by a clamping system, and a machining unit configured to machine the center groove in the pulley and the flange of the crankshaft.

20 Claims, 8 Drawing Sheets

(51) Int. Cl.
*B23Q 17/12* (2006.01)
*B23Q 3/04* (2006.01)
*G01M 1/34* (2006.01)
*B23Q 16/00* (2006.01)
*B23B 49/04* (2006.01)

(52) U.S. Cl.
CPC ... *B23C 2215/20* (2013.01); *Y10T 409/30896* (2015.01); *Y10T 409/303752* (2015.01)

(58) Field of Classification Search
CPC ........ G01M 1/24; G01M 1/26; B23Q 1/5406; B23P 2700/07; Y10T 409/305824; Y10T 409/30896; Y10T 409/30756; Y10T 409/307616; Y10T 409/30–309968
USPC ...................................... 29/6.01; 409/64–242
See application file for complete search history.

(56) References Cited

U.S. PATENT DOCUMENTS

| | | |
|---|---|---|
| 6,203,478 B1 | 3/2001 | Gorrochategui |
| 6,228,007 B1 | 5/2001 | Quak et al. |
| RE37,794 E | 7/2002 | Egbert |
| 8,528,447 B2 | 9/2013 | Tatsuda |
| 9,539,654 B2 | 1/2017 | Garces et al. |
| 2006/0185453 A1 | 8/2006 | Miyazawa et al. |
| 2013/0287511 A1 | 10/2013 | Yoshimoto |
| 2015/0306681 A1 | 10/2015 | Yoshimoto et al. |
| 2016/0033006 A1 | 2/2016 | Leverington |
| 2018/0120191 A1 | 5/2018 | Holland et al. |

\* cited by examiner

MACHINING CENTER FOR PROCESSING CENTER GROOVE AND CENTER GROOVE PROCESSING METHOD OF A CRANKSHAFT USING THE SAME

CROSS-REFERENCE TO RELATED APPLICATIONS

This application is a divisional of U.S. patent application Ser. No. 16/919,446, filed on Jul. 2, 2020, which application claims the benefit of Korean Patent Application No. 10-2019-0159403, filed in the Korean Intellectual Property Office on Dec. 3, 2019, which applications are hereby incorporated herein by reference.

TECHNICAL FIELD

The present invention relates to a machining center for processing a center groove and a center groove processing method of a crankshaft using the same.

BACKGROUND

In general, a crankshaft of an engine is formed after a forging operation, such that a pulley and a flange are respectively formed on opposite end surfaces of the crankshaft through a milling operation, and a processing groove including a plurality of bolt grooves and a center groove is formed on the pulley and the flange, in a crankshaft processing line.

In this case, the processing groove is formed by a drilling operation, and particularly, the center groove serves as a reference for the machining center of the crankshaft, and thus precise machining is required by setting a position, a machining angle, a depth, and a diameter of each of the center grooves.

However, in a center groove processing process of the crankshaft according to the prior art, the center grooves of the pulley and the flange are not positioned in a straight line, and thus a deviation occurs.

As a result, the crankshaft processed by the center grooving process according to the prior art generates engine noise, and a problem occurs in its durability as an operating time passes.

The above information disclosed in this Background section is only for enhancement of understanding of the background of the invention, and therefore it may contain information that does not form the prior art that is already known to a person of ordinary skill in the art.

SUMMARY

The present invention relates to a machining center for processing a center groove and a center groove processing method of a crankshaft using the same. Particular embodiments relate to a center groove machining center of a crankshaft which can machine center grooves of a pulley and a flange that are positioned in a straight line, and a center groove machining method of the crankshaft using the same.

An exemplary embodiment of the present invention provides a center groove machining center of a crankshaft which can machine center grooves of a pulley and a flange formed at opposite ends of the crankshaft that are positioned in a straight line, and a center groove machining method of the crankshaft using the same.

In one or more exemplary embodiments of the present invention, a machining center for machining center grooves in a pulley and a flange formed on opposite ends of a crankshaft of a vehicle includes a measurement unit configured to measure a moment of the crankshaft when the crankshaft is loaded and is actuated, a control unit configured to calculate an imbalance amount of the crankshaft depending on the moment and to derive center drill coordinates for removing the imbalance amount of the crankshaft, a compensation unit mounted in a base frame to compensate a position of the crankshaft by rotating first and second rotating elements based on the center drill coordinates which are inputted from the control unit when the crankshaft is transported and clamped by a clamping system, and a machining unit configured to machine the center groove in the pulley and the flange of the crankshaft, a position of which is compensated through the compensation unit.

In addition, the measurement unit may include a balance frame in which the crankshaft is loaded, and a vibration sensor mounted at a first side of the balance frame to measure a moment of the crankshaft when the crankshaft is actuated.

The compensation unit may include a first rotating element configured to be upwardly bent such that opposite sides are symmetrical to form opposite supporters, and to rotate at a predetermined angle with respect to a horizontal axis formed by allowing the opposite supporters to be mounted to the base frame, a second rotating element disposed at a central portion of the first rotating element to rotate 360° with respect to a vertical axis mounted to the first rotating element, and a clamping system mounted on an upper surface of the second rotating element to clamp the crankshaft.

In addition, the first rotating element may be installed in the base frame such that the opposite supporters are rotatable at a predetermined angle through a ring gear and a servo motor for operating the ring gear.

The second rotating element may be rotatably installed on an upper surface of the first rotating element through a ring gear and a servo motor for operating the ring gear.

The clamping system may include a first clamper disposed at a central portion of the crankshaft in a longitudinal direction thereof to fix a horizontal position of the crankshaft by supporting a lower portion of the crankshaft, a second clamper disposed at a lower side of the crankshaft in a longitudinal direction thereof to fix a phase-directional position of the crankshaft by pressing a cam configured at a side on the crankshaft from opposite sides of the crankshaft with respect to a width direction thereof, and a third clamper disposed at opposite ends of the crankshaft in a longitudinal direction thereof to fix a vertical position of the crankshaft by vertically pressing the opposite sides of the crankshaft in a longitudinal direction thereof.

The first clamper may include a protrusion that downwardly protrudes toward the crankshaft, and is fixed in the horizontal direction of the crankshaft through the protrusion which is actuated along the longitudinal direction of the crankshaft by a hydraulic cylinder.

The second clamper may include opposite fixers that are actuated in a direction that is closer to and away from the cam by the hydraulic cylinder relative to the width direction of the crankshaft, and that press the cam through the opposite fixers to set the phase-directional position of the crankshaft.

The third clamper may include a lower jig configured to support a lower portion of the crankshaft by forming an inclined surface on which the crankshaft is seated, and to include a plurality of lower pads mounted on the inclined surface to protrude toward the crankshaft to press the crankshaft, and an upper jig disposed at an upper portion of the lower jig to be actuated in a vertical direction by a hydraulic cylinder, and to include a plurality of upper pads mounted on a pressing surface contacting the crankshaft to protrude toward the crankshaft to press the crankshaft.

The machining unit may include a spindle disposed to correspond to the crankshaft mounted to the compensation unit, and a center drill mounted to the spindle to machine the center groove.

The machining unit may be mounted at a first side of the base frame through a slide frame that is actuated forward and backward relative to the crankshaft.

In one or more exemplary embodiments of the present invention, a machining method for machining a center groove on a pulley and a flange formed at opposite ends of a crankshaft using a center groove machining center of a crankshaft includes a first step of seating the crankshaft on a measurement unit and measuring a moment through the measurement unit when the crankshaft is actuated, a second step of deriving center drill coordinates on the pulley and the flange through a control unit based on the moment, a third step of transporting and fixing the crankshaft to a clamping system of a compensation unit, a fourth step of correctly positioning the crankshaft through a first rotating element and a second rotating element based on the center drill coordinates, and a fifth step of machining the center groove on the pulley and the flange of the crankshaft through a machining unit.

The first step may include seating the crankshaft in a balance frame of the measurement unit, rotating the crankshaft, and measuring a moment of the crankshaft through a vibration sensor mounted at a first side of the balance frame.

The second step may include calculating an imbalance amount based on the moment, and deriving center drill coordinates to remove an imbalance amount of the crankshaft based on the imbalance amount.

The third step may include transporting and fixing the crankshaft to a clamping system of a compensation unit.

The clamping system may include a first clamper configured to fix a horizontal position of the crankshaft by supporting a lower center of the crankshaft in a longitudinal direction thereof, a second clamper configured to fix a phase-directional position of the crankshaft by clamping a cam at a side on the crankshaft, and a third clamper configured to fix a vertical position of the crankshaft by pressing opposite ends of the crankshaft.

The fourth step may include rotating about a horizontal axis of the first rotating element based on the center drill coordinates, and rotating about a vertical axis of the second rotating element based on the center drill coordinates.

The fifth step may include machining a center groove on the pulley by using a center drill by actuation of a spindle, loading the flange at a position corresponding to the center drill by rotating the second rotating element by 180°, and machining a center groove on the flange by using the center drill by actuation of the spindle.

The method may further include, after the fifth step, returning the first rotating element and the second rotating element to an initial state.

The method may further include, after the fifth step, inspecting whether each center groove of the pulley and the flange is positioned in a straight line.

According to the exemplary embodiments of the present invention, the center groove machining center of the crankshaft and the center groove machining method of the crankshaft using the same can machine center grooves of a pulley and a flange formed at opposite ends of the crankshaft that are positioned in a straight line.

Accordingly, the noise of the engine may be reduced while durability may be increased.

In addition, according to the exemplary embodiments of the present invention, the center groove machining center of the crankshaft and the center groove machining method of the crankshaft using the same may be shared regardless of the type of crankshaft by clamping the crankshaft by the clamping system including the first to third clampers.

Further, effects that can be obtained or expected from exemplary embodiments of the present invention are directly or suggestively described in the following detailed description. That is, various effects expected from exemplary embodiments of the present invention will be described in the following detailed description.

Figure 1:
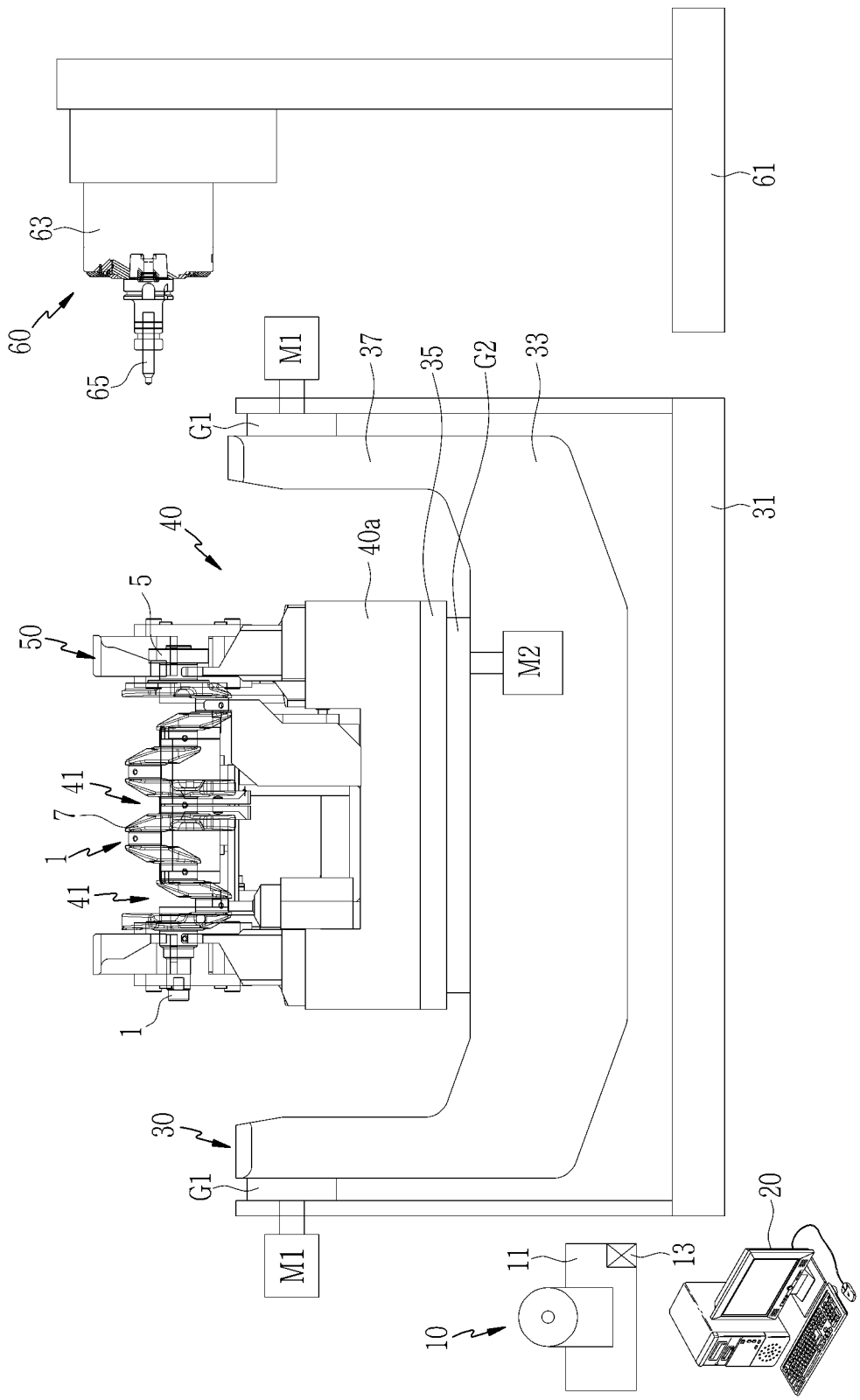
FIG. 1 illustrates a general block diagram of a center groove machining center of a crankshaft according to an exemplary embodiment of the present invention.

The following reference numbers can be used in conjunction with the drawings:

| | |
|---|---|
| 1: crankshaft | 3: pulley |
| 5: flange | 7: cam |
| 10: measurement unit | 11: balance frame |
| 13: vibration sensor | 20: control unit |
| 30: compensation unit | 31: base frame |
| 33: first rotating element | 35: second rotating element |
| 37: supporter | 40: clamping system |
| 40a: base body | 41: first clamper |
| 42: cylinder case | 43: protrusion |
| 44: connection bracket | 45: second clamper |
| 47: fixer | 48a: actuation rod |
| 48b: connection rod | 48c: gear portion |
| 49: proximity sensor | 50: third clamper |
| 51: lower jig | 52: connection |
| 53: inclined surface | 54: hinge portion |
| 55: lower pad | 57: upper jig |
| 58: pressing surface | 59: upper pad |
| 60: machining unit | 61: base frame |
| 63: spindle | 65: center drill |

DETAILED DESCRIPTION OF ILLUSTRATIVE EMBODIMENTS

Hereinafter, the present invention will be described more fully with reference to the accompanying drawings, in which exemplary embodiments of the invention are shown. As those skilled in the art would realize, the described embodiments may be modified in various different ways, all without departing from the spirit or scope of the present invention.

Parts that are irrelevant to the description will be omitted to clearly describe the present disclosure, and like reference numerals designate like elements throughout the specification.

In the following description, dividing names of components into first, second, and the like is to divide the names because the names of the components are the same, and an order thereof is not particularly limited.

FIG. 1 illustrates a general block diagram of a center groove machining center of a crankshaft according to an exemplary embodiment of the present invention.

FIG. 1 illustrates an overall configuration of the center groove machining center, and is not related to an actual size and a disposal position of each element.

Referring to FIG. 1, the center groove machining center of the crankshaft according to an exemplary embodiment of the present invention is for machining center grooves on a pulley 3 and a flange 5 formed at opposite ends of a crankshaft 1 of a vehicle.

That is, the crankshaft 1, in which the pulley 3 and the flange 5 are formed at opposite ends through a milling operation, may be transferred after a forging operation, and then the center groove machining center may be applied to machine the center grooves on the pulley 3 and the flange 5 of the crankshaft 1.

In this case, the center grooves, which are to be formed for roughing and finishing operations to be performed later, may be referred to as grooves that serve as a center for the roughing and finishing operations.

Failure to balance the center grooves of the pulley 3 and the flange 5 may adversely affect a shape of each component in subsequent operations.

Therefore, it is important to balance each center groove.

The center grooving machining center for machining such center grooves includes a measurement unit 10, a control unit 20, a compensation unit 30, and a machining unit 60. The control unit or controller 20 can be implemented with a computer as illustrated in FIG. 1.

The measurement unit 10 includes a balance frame 11 in which the crankshaft 1 is loaded through a transport robot (not illustrated).

The crankshaft 1 loaded in the balance frame 11 is rotated, and at this time, a moment of the crankshaft 1 is measured by a vibration sensor 13 mounted at a first side of the balance frame 11.

The control unit 20 receives the moment and calculates an imbalance amount of the crankshaft 1 based on the moment.

Next, the control unit 20 derives center drill coordinates to remove the imbalance amount of the crankshaft 1.

Figure 2:
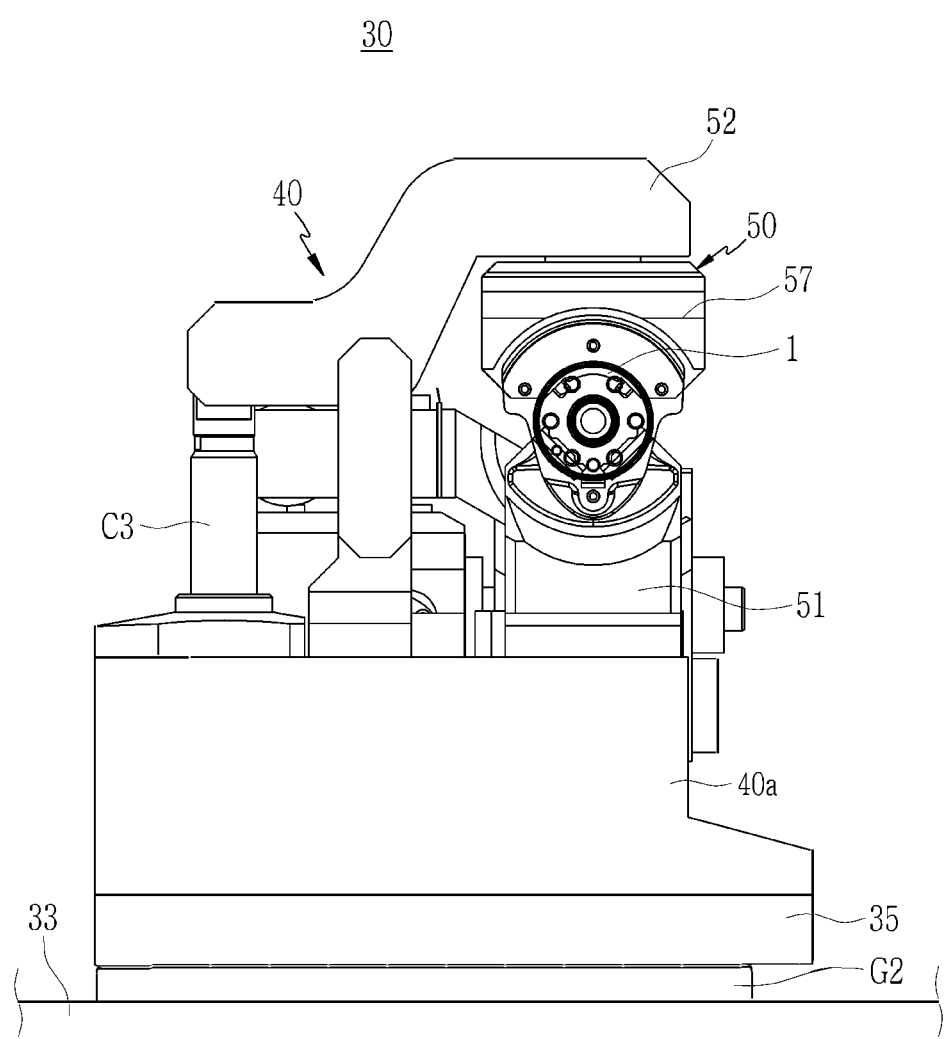
FIG. 2 schematically illustrates a correction unit applied to a center groove machining center of a crankshaft according to an exemplary embodiment of the present invention.

FIG. 2 illustrates a correction unit applied to a center groove machining center of a crankshaft according to an exemplary embodiment of the present invention.

Referring to FIG. 2 together with FIG. 1, the correction unit 30 has a structure in which an entire apparatus is installed in a base frame 31.

A first rotating element 33 is mounted to the base frame 31.

Opposite ends of the first rotating element 33 are bent upwardly to form opposite supporters 37, and the first rotating element 33 is rotatably mounted to the base frame 31 through the opposite supporters 37.

That is, the first rotating element 33 is rotatably mounted to the base frame 31 by the supporters 37 at a predetermined angle.

The first rotating element 33 may rotate based on a horizontal axis formed between the base frame 31 and the first rotating element 33.

For example, the first rotating element 33 may be rotatably configured from the base frame 31 through a ring gear G1 and a servo motor M1 for operating the ring gear G1.

A second rotating element 35 is configured on an upper surface of a central portion of the first rotating element 33.

The second rotating element 35 is formed to have a disc shape, and is rotatably mounted from the first rotating element 33.

The second rotating element 35 is configured to rotate based on a vertical axis formed between the first rotating element 33 and the second rotating element 35.

For example, the second rotating element 35 may be mounted to the first rotating element 33 through a ring gear G2 and a servo motor M2 for operating the ring gear G2.

A clamping system 40 for clamping the crankshaft 1 is configured on an upper surface of the second rotating element 35.

FIG. 3 to FIG. 7 illustrate a clamping system applied to a center groove machining center of a crankshaft according to an exemplary embodiment of the present invention.

Figure 3:
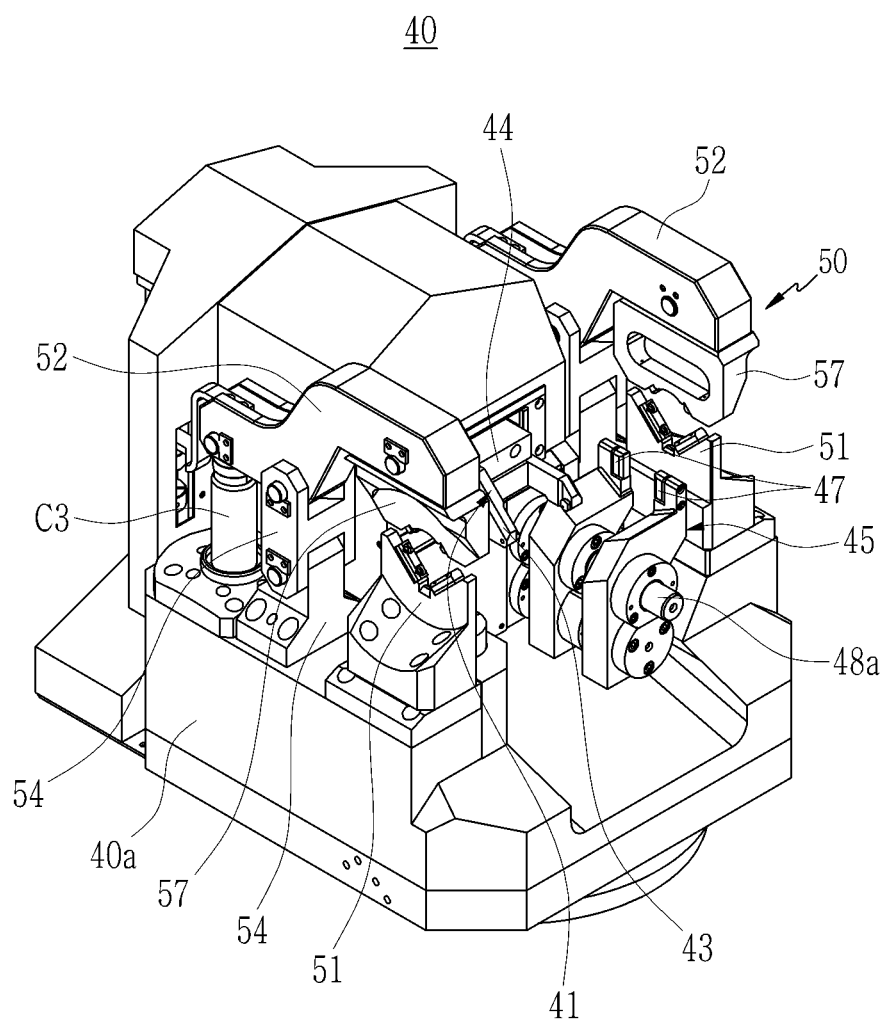
FIG. 3 to FIG. 7 illustrate a clamping system applied to a center groove machining center of a crankshaft according to an exemplary embodiment of the present invention.

Referring to FIG. 3, the clamping system 40 includes first to third clampers 41, 45, and 50 for clamping the crankshaft 1 in a longitudinal direction of the crankshaft 1.

The clamping system 40 has a structure in which an entire apparatus is installed in a base body 40a installed in the second rotating element 35.

In this clamping system 40, the crankshaft 1 is disposed in the horizontal direction at a first side of the base body 40a, and the crankshaft 1 is clamped by the first to third clampers 41, 45, and 50.

Figure 4:
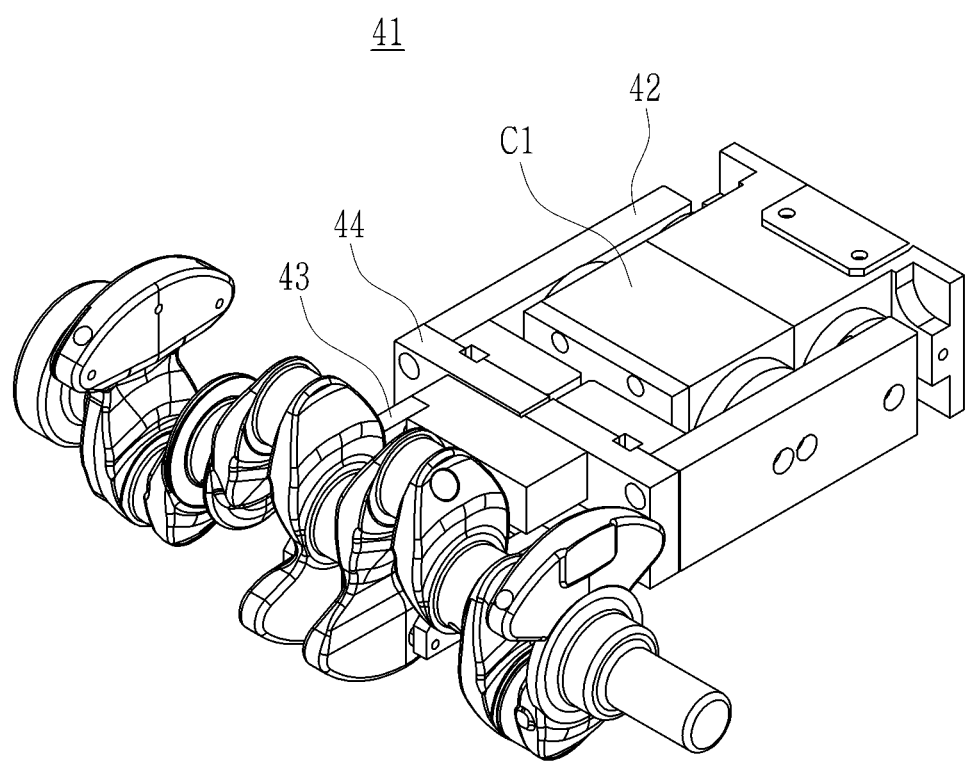

Referring to FIG. 4 together with FIG. 3, the first clamper 41 is installed in the base body 40a and disposed corresponding to a central portion of the crankshaft 1.

The first clamper 41 may support a lower portion of the crankshaft 1 to fix a horizontal position of the crankshaft 1.

The first clamper 41 supports the lower portion of the crankshaft 1 through a pair of protrusions 43 protruding downwardly and inclined toward the crankshaft 1.

The pair of protrusions 43 operates in a direction closer to or away from each other along a longitudinal direction of the crankshaft 1 through a hydraulic cylinder C1.

That is, the hydraulic cylinder C1 is installed in a cylinder case 42, and the pair of protrusions 43 are mounted at a first side of the cylinder case 42 through connection brackets 44 which are connected to the hydraulic cylinder C1 to be slidable.

The pair of protrusions 43 may move through the connection brackets 44 on which the protrusions 43 are mounted, to set a correct position depending on types of the crankshaft 1, thereby supporting a lower portion of the crankshaft 1.

In addition, the first clamper 41 is installed by inserting the hydraulic cylinder C1 into the base body 40a, to support the lower portion of the crankshaft 1 by the pair of protrusions 43 protruding from the base body 40a.

Figure 5:
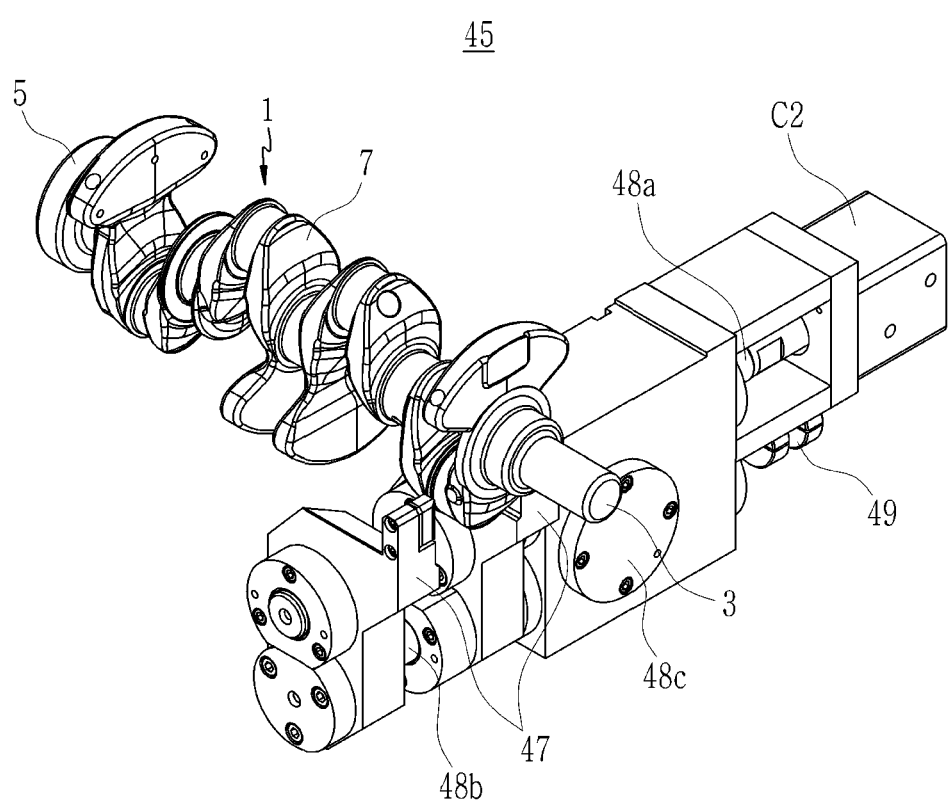
Figure 6:
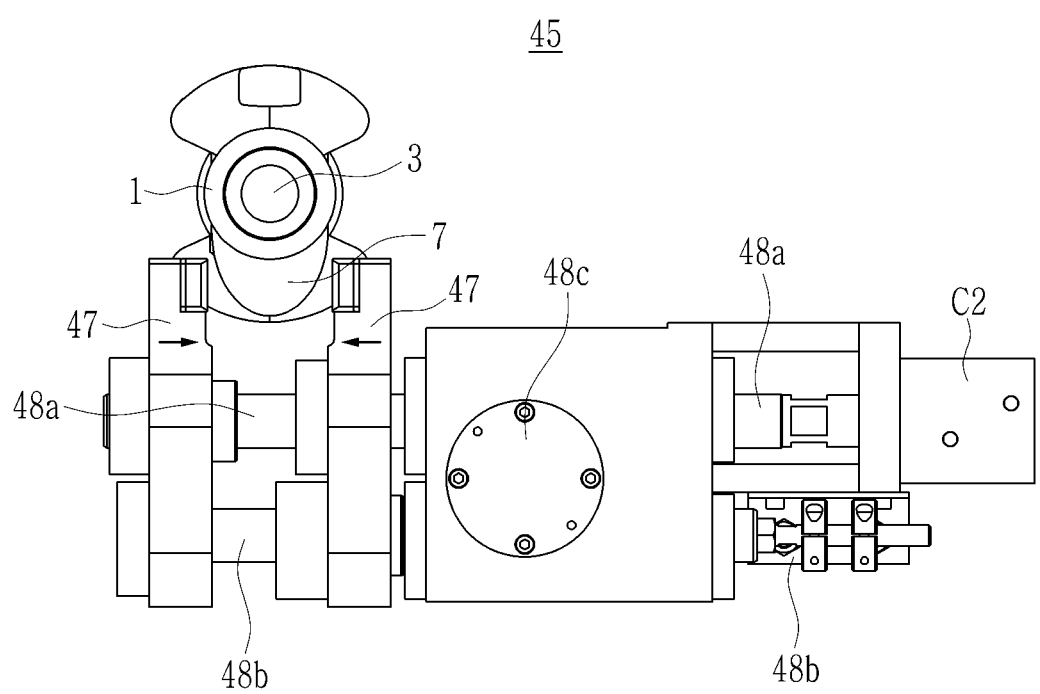

Referring to FIG. 5 and FIG. 6, the second clamper 45 is disposed at a first side of the lower portion of the crankshaft 1 in a longitudinal direction.

The second clamper 45 may be disposed to be close to the pulley 3 of the crankshaft 1.

The second clamper 45 fixes the crankshaft 1 in a phase direction by pressing a cam 7 configured at a first side of the crankshaft 1 from opposite sides with respect to a width direction of the crankshaft 1.

In other words, the second clamper 45 clamps the cam 7 to prevent rotation of the crankshaft 1.

The second clamper 45 includes opposite side fixers 47 which operate in a direction closer to and away from the cam 7 based on the width direction of the crankshaft 1 by the hydraulic cylinder C2.

A first fixer of the opposite side fixers 47 is connected to an actuation rod 48a of the hydraulic cylinder C2, and a second fixer is engaged with the actuation rod 48a, to be connected to a connection rod 48b that moves relative to the actuation rod 48a.

In this case, a gear portion 48c is configured between the actuation rod 48a and the connection rod 48b, and as the hydraulic cylinder C2 is actuated, the actuation rod 48a and the connection rod 48b connected to the actuation rod 48a move relative to each other through the gear portion 48c.

The opposite side fixers 47 press the cam 7 to fix the crankshaft 1 so as to not rotate.

In addition, the second clamper 45 includes a proximity sensor 49 mounted at a first side thereof.

The second clamper 45 may check whether the opposite side fixers 47 are clamped through the proximity sensor 49.

Figure 7:
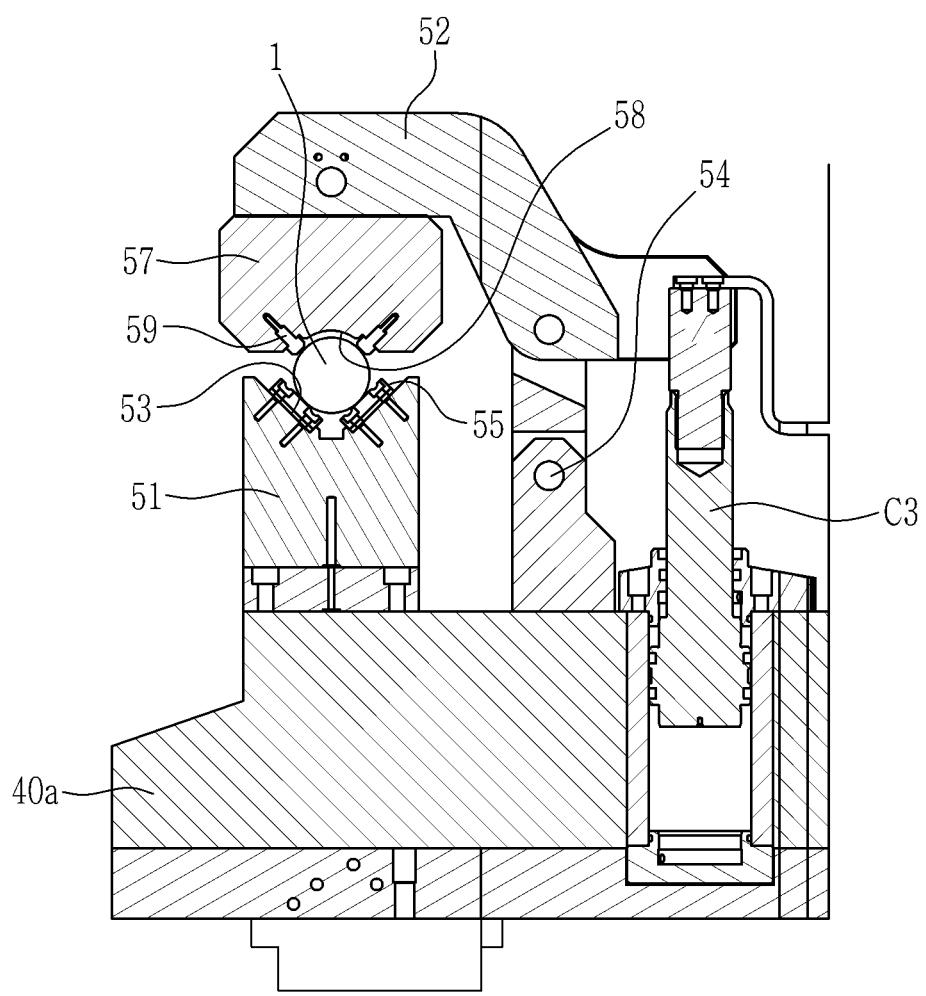

Referring to FIG. 7, the third clamper 50 includes a lower jig 51 and an upper jig 57, which are both configured at opposite ends of the crankshaft 1.

The lower jig 51 is a jig fixed to the base body 40a and on which the crankshaft 1 is seated.

The lower jig 51 forms an inclined surface 53 that is inclined downward toward a center such that the crankshaft 1 can be seated.

For example, the lower jig 51 may be formed to have a V shape.

A plurality of lower pads 55 for pressing the crankshaft 1 are mounted on the inclined surface 53 of the lower jig 51.

The lower pads 55 are in contact with the crankshaft 1 to serve as a clamper to protect the crankshaft 1.

In addition, the upper jig 57 is disposed to correspond to an upper portion of the lower jig 51.

The upper jig 57 presses and fixes the upper side of the crankshaft 1 seated on the lower jig 51.

A plurality of upper pads 59 protruding toward the crankshaft 1 are mounted on a pressing surface 58 that is in contact with the crankshaft 1 in the upper jig 57.

The upper pads 59 serve as a clamper to protect the crankshaft 1 like the lower pads 55.

The upper jig 57 may be actuated in a vertical direction by a hydraulic cylinder C3.

In this case, the hydraulic cylinder C3 may be mounted in the base body 40a.

In addition, the upper jig 57 is connected to the hydraulic cylinder C3 through a connection 52.

In other words, the upper jig 57 is mounted at a first end of the connection 52, the hydraulic cylinder C3 is mounted at a second end of the connection 52, and a hinge portion 54 is configured at a center thereof.

The upper jig 57 is configured to be actuated in the vertical direction with respect to the lower jig 51 by actuation of the hydraulic cylinder C3 in a state where the connection 52 is centrally supported via the hinge portion 54.

The third clamper 50 including the lower jig 51 and the upper jig 57 may be formed at opposite ends of the crankshaft 1, i.e., at positions corresponding to insides of the pulley 3 and the flange 5 with respect to a center of the crankshaft 1.

Referring back to FIG. 1, the machining unit 60 is configured to correspond to positions of the pulley 3 and the flange 5 of the crankshaft 1 mounted on the compensation unit 30 as described above.

The machining unit 60 is mounted to a slide frame 61 including a spindle 63 and a center drill 65 fitted into the spindle 63 to be slidably movable on the base frame 31.

The slide frame 61 may be configured at a first side of the base frame 31 to slide forward and backward with respect to the crankshaft 1.

This machining unit 60 directly machines the center grooves on the pulley 3 and flange 5.

Specifically, the machining unit 60 may allow the center drill 65 to machine the center grooves on the pulley 3 and the flange 5 as the slide frame 61 moves to the crankshaft 1 and the spindle 63 rotates.

A method of machining the center grooves of the crankshaft 1 by using the machining center of the center grooves of the crankshaft configured as described above will be described as follows.

Figure 8:
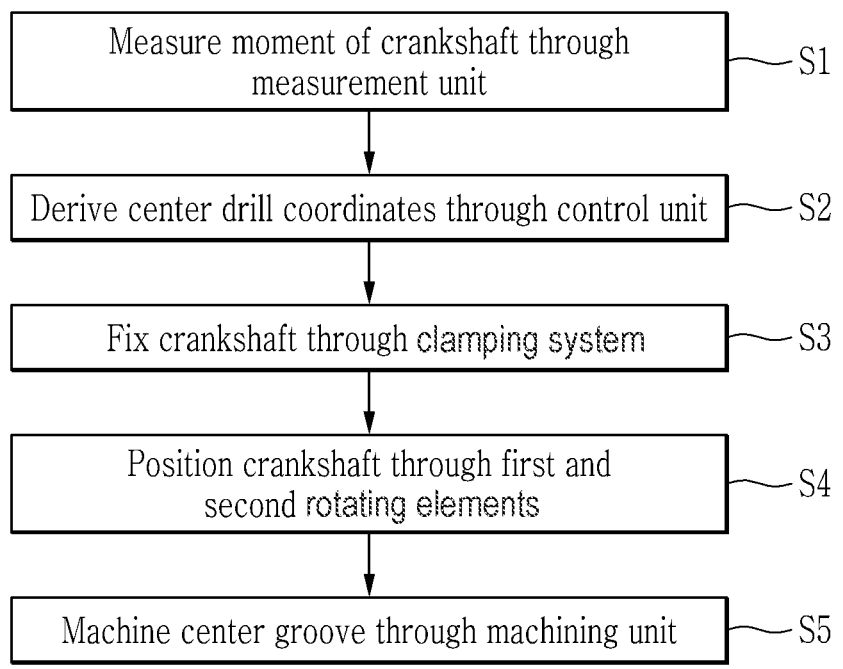
FIG. 8 illustrates a flowchart showing a method of machining a center groove of a crankshaft by using a machining center of a crankshaft according to an exemplary embodiment of the present invention.

FIG. 8 illustrates a flowchart showing a method of machining a center groove of a crankshaft by using a machining center of a crankshaft according to an exemplary embodiment of the present invention.

Referring to FIG. 8, the crankshaft 1 is seated in the measurement unit 10.

The crankshaft 1 is actuated to rotate through the measurement unit 10, and at this time, a moment of the crankshaft 1 is measured through the vibration sensor 13 (S1).

The control unit 20 derives center drill coordinates on the pulley 3 and the flange 5 based on the moment (S2).

At the same time, the crankshaft 1 is transported to the clamping system 40 of the compensation unit 30.

In this case, opposite ends of the crankshaft 1 are supported by the lower jig 51 of the third clamper 50 so that the crankshaft 1 is seated.

In addition, a lower center of the crankshaft 1 is supported by the first clamper 41.

The cam 7 on the crankshaft 1 is clamped by the second clamper 45 to fix the crankshaft 1 so as to not rotate (S3).

On the other hand, the control unit 20 calculates an imbalance amount M of the crankshaft 1 by using Equation 1 based on the measured moment.

$$F = MR\omega^2 \qquad \text{[Equation 1]}$$

(F indicates the moment of the crankshaft, M indicates the amount of imbalance to be obtained, R indicates an angular radius of the pulley and the flange, and ω indicates an angular speed at which the crankshaft rotates.)

Next, the control unit 20 derives coordinates of the center of gravity to remove the imbalance amount of the crankshaft 1 based on the imbalance amount, that is, the center drill coordinates for positions of the center grooves to be machined.

The control unit 20 calculates positions where the center grooves of the pulley 3 and the flange 5 are to be machined by using Equation 2, Equation 3, and Equation 4 based on the center drill coordinates, and transmits them to the first rotating element 33 and the second rotating element 35, which will be described below.

These coordinates of the center of gravity may be derived based on the first and second rotating elements 33 and 35.

$$\theta = \text{Tan}^{-1}\left(\frac{Y_r - T_F}{\ell}\right) \qquad \text{[Equation 2]}$$

($Y_r$ indicates a mass center Y coordinate of the flange, $Y_F$ indicates a mass center Y coordinate of the pulley, and l indicates a full length of the crankshaft.)

The rotation angle of the first rotating element 33 or the second rotating element 35 may be obtained by Equation 2.

$$Ay + Bz + C = 0 \quad \text{[Equation 3]}$$

A straight line connecting the center drill coordinates of the pulley 3 and the flange 5 can be obtained by using Equation 3 and the center drill coordinates.

$$d = \frac{|ax + by + c|}{\sqrt{a^2 + b^2}} \quad \text{[Equation 4]}$$

A rotation center point of the first rotating element 33 or the second rotating element 35 may be obtained by using Equation 4, and a distance d between the rotation center point and the straight line may be obtained by using the straight line obtained from Equation 3.

Accordingly, the rotation angle of the first rotating element 33 and the second rotating element 35 may be set by the distance d (S4).

The first rotating element 33 and the second rotating element 35 are rotated by the above steps.

Herein, the first rotating element 33 may rotate at a predetermined angle with respect to a horizontal axis, and the second rotating element 35 may rotate at a predetermined angle with respect to a vertical axis, to position the crankshaft 1 at a predetermined point.

Next, the slide frame 61 is moved toward the crankshaft 1, and as the spindle 63 is actuated, the center grooves are machined on the pulley 3 of the crankshaft 1 positioned by using the center drill 65 (S5).

When the center grooves are machined on the pulley 3, the second rotating element 35 is rotated by 180° to load the flange 5 at a position corresponding to the center drill 65.

Subsequently, as the spindle 63 rotates, the center grooves are machined on the flange 5 by using the center drill 65.

After the machining, the first rotating element 33 and the second rotating element 35 are returned to the initial state, and an operation of inspecting whether the center grooves of the pulley 3 and the flange 5 are aligned in a straight line is performed after completion.

Finally, roughing and finishing operations are performed based on the center grooves of the crankshaft 1.

Therefore, according to the exemplary embodiments of the present invention, the center groove machining center of the crankshaft and the center groove machining method of the crankshaft using the same may stabilize runout of the crankshaft 1 by positioning the center grooves formed on each of the pulley 3 and the flange 5 formed at opposite ends of the crankshaft 1 on a straight line, to thereby reduce engine noise and increase durability.

In addition, according to the exemplary embodiments of the present invention, the center groove machining center of the crankshaft and the center groove machining method of the crankshaft using the same may be shared regardless of types of the crankshaft 1 by clamping the crankshaft 1 by the clamping system 40 including the first to third clampers 41, 45, and 50.

That is, the clamping may be performed regardless of the diameter of the crankshaft 1, thereby machining the center grooves on each of the pulley 3 and the flange 5.

Accordingly, an investment cost and a process time may be reduced.

While the present invention has been particularly shown and described with reference to specific embodiments thereof, it will be understood by those skilled in the art that various changes in form and detail may be made therein without departing from the spirit and scope of the invention as defined by the following claims.

What is claimed is:

1. A machining method for machining a center groove on each of a pulley and a flange formed at opposite ends of a crankshaft, the machining method comprising:
   a first step of seating the crankshaft on a measurement unit and measuring a moment through the measurement unit;
   a second step of deriving center drill coordinates on the pulley and the flange based on the moment using a controller;
   a third step of transporting and fixing the crankshaft to a clamping system of a compensation unit;
   a fourth step of correctly positioning the crankshaft through a first rotating element and a second rotating element based on the center drill coordinates derived by the controller; and
   a fifth step of machining the center grooves on each of the pulley and the flange of the crankshaft through a machining unit.

2. The machining method of claim 1, wherein the first step comprises:
   seating the crankshaft in a balance frame of the measurement unit;
   rotating the crankshaft; and
   measuring the moment of the crankshaft through a vibration sensor mounted at a first side of the balance frame.

3. The machining method of claim 1, wherein the second step comprises:
   calculating an imbalance amount based on the moment; and
   deriving the center drill coordinates to remove the imbalance amount of the crankshaft based on the imbalance amount.

4. The machining method of claim 1, wherein the clamping system is mounted on an upper surface of the second rotating element.

5. The machining method of claim 1, wherein the clamping system includes:
   a first clamper fixing a horizontal position of the crankshaft by supporting a lower center of the crankshaft in a longitudinal direction of the crankshaft;
   a second clamper fixing a phase-directional position of the crankshaft by clamping a cam at a side on the crankshaft; and
   a third clamper fixing a vertical position of the crankshaft by pressing opposite ends of the crankshaft.

6. The machining method of claim 1, wherein the fourth step comprises:
   rotating about a horizontal axis of the first rotating element based on the center drill coordinates; and
   rotating about a vertical axis of the second rotating element based on the center drill coordinates.

7. The machining method of claim 1, wherein the fifth step comprises:
   machining the center groove on the pulley by using a center drill by actuation of a spindle;
   loading the flange at a position corresponding to the center drill by rotating the second rotating element by 180°; and
   machining the center groove on the flange by using the center drill by actuation of the spindle.

8. The machining method of claim 1, further comprising, after the fifth step, returning the first rotating element and the second rotating element to an initial state.

9. The machining method of claim 8, further comprising, after the fifth step, inspecting whether the center grooves of each of the pulley and the flange are positioned in a straight line.

10. A method for machining a center groove on each of a pulley and a flange formed at opposite ends of a crankshaft of a vehicle, the method comprising:
- measuring a moment of the crankshaft by a measurement unit when the crankshaft is loaded in the measurement unit;
- calculating an imbalance amount of the crankshaft depending on the moment and deriving center drill coordinates for removing the imbalance amount of the crankshaft;
- clamping the crankshaft using a clamping system;
- compensating a position of the crankshaft using a compensation unit mounted in a base frame by rotating first and second rotating elements based on the center drill coordinates; and
- machining the center groove in each of the pulley and the flange of the crankshaft using a machining unit, wherein a position of the center grooves is compensated through the compensation unit;
- wherein the first rotating element is a U-shaped element comprising symmetrical opposite sides that form opposite supporters, the first rotating element being rotatable about a horizontal axis extending between the opposite supporters;
- wherein the second rotating element is disposed at a central portion of the first rotating element and is rotatable 360° about an axis that is perpendicular to the horizontal axis; and
- wherein the clamping system is mounted on an upper surface of the second rotating element.

11. The method of claim 10, wherein measuring the moment comprises:
- seating the crankshaft in a balance frame of the measurement unit; and
- measuring the moment of the crankshaft through a vibration sensor mounted at a first side of the balance frame.

12. The method of claim 10, wherein the first rotating element is installed in the base frame, and wherein the opposite supporters are rotatable via a ring gear and a servo motor for operating the ring gear.

13. The method of claim 10, wherein the second rotating element is rotatably installed on an upper surface of the first rotating element via a ring gear and a servo motor for operating the ring gear.

14. The method of claim 10, wherein the clamping system comprises:
- a first clamper disposed at a central portion of the crankshaft in a longitudinal direction of the crankshaft and fixing a horizontal position of the crankshaft by supporting a lower portion of the crankshaft;
- a second clamper disposed at a lower side of the crankshaft in the longitudinal direction and fixing a phase-directional position of the crankshaft by pressing a cam disposed at a side on the crankshaft; and
- a third clamper disposed at opposite ends of the crankshaft in the longitudinal direction and fixing a vertical position of the crankshaft.

15. The method of claim 14, wherein the first clamper includes a protrusion that protrudes toward the crankshaft, and the first clamper is fixed in a horizontal direction of the crankshaft through the protrusion which is actuated along the longitudinal direction of the crankshaft by a hydraulic cylinder.

16. The method of claim 15, wherein the second clamper includes opposite fixers that are actuated to move in a direction that is closer to and away from the cam by a further hydraulic cylinder and that press the cam through the opposite fixers to set the phase-directional position of the crankshaft.

17. The method of claim 14, wherein the third clamper comprises:
- a lower jig supporting a lower portion of the crankshaft by forming a lower jig surface on which the crankshaft is seated, the lower jig comprising a plurality of lower pads mounted on the lower jig surface to protrude from the lower jig toward the crankshaft to press the crankshaft; and
- an upper jig disposed at an upper portion of the lower jig, the upper jig being actuated in a vertical direction by a hydraulic cylinder, wherein the upper jig comprises a plurality of upper pads mounted on a pressing surface contacting the crankshaft to protrude from the upper jig toward the crankshaft to press the crankshaft.

18. The method of claim 10, wherein the machining unit comprises:
- a spindle disposed to correspond to the crankshaft mounted to the compensation unit; and
- a center drill mounted to the spindle.

19. The method of claim 18, wherein the machining unit is mounted at a first side of the base frame via a slide frame that is actuated forward and backward relative to the crankshaft.

20. The method of claim 18, wherein machining the center groove in each of the pulley and the flange of the crankshaft comprises:
- machining the center groove on the pulley by using the center drill by actuation of the spindle;
- loading the flange at a position corresponding to the center drill by rotating the second rotating element by 180°; and
- machining the center groove on the flange by using the center drill by actuation of the spindle.

* * * * *